(12) United States Patent
Senko et al.

(10) Patent No.: US 11,875,981 B2
(45) Date of Patent: *Jan. 16, 2024

(54) METHODS AND APPARATUS FOR HIGH SPEED MASS SPECTROMETRY

(71) Applicant: Thermo Finnigan LLC, San Jose, CA (US)

(72) Inventors: Michael W. Senko, Sunnyvale, CA (US); Philip M. Remes, San Jose, CA (US)

(73) Assignee: THERMO FINNIGAN LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,305

(22) Filed: Jun. 30, 2022

(65) Prior Publication Data

US 2022/0336198 A1  Oct. 20, 2022

Related U.S. Application Data

(62) Division of application No. 16/678,879, filed on Nov. 8, 2019, now Pat. No. 11,380,531.

(51) Int. Cl.
*H01J 49/00* (2006.01)
*H01J 49/42* (2006.01)
*G01N 27/622* (2021.01)

(52) U.S. Cl.
CPC ........ *H01J 49/0031* (2013.01); *G01N 27/622* (2013.01); *H01J 49/0072* (2013.01); *H01J 49/421* (2013.01); *H01J 49/4225* (2013.01)

(58) Field of Classification Search
CPC .. H01J 49/0031; H01J 49/0072; H01J 49/421; H01J 49/4225; G01N 27/622
See application file for complete search history.

(56) References Cited

U.S. PATENT DOCUMENTS

| 7,838,826 | B1 | 11/2010 | Park |
| 8,680,461 | B2 | 3/2014 | Rardin et al. |
| 9,269,551 | B2 | 2/2016 | Ueda |
| 9,683,964 | B2 | 6/2017 | Park et al. |
| 9,824,871 | B2 | 11/2017 | Senko et al. |
| 9,831,076 | B2 | 11/2017 | Kovtoun et al. |

(Continued)

OTHER PUBLICATIONS

El Hadri et al., "Impact of and correction for instrument sensitivity drift on nanoparticle size measurements by single-particle ICP-MS", Analytical and Bioanalytical Chemistry, Feb. 19, 2016, vol. 408, No. 19, pp. 5099-5108.

(Continued)

*Primary Examiner* — David E Smith
(74) *Attorney, Agent, or Firm* — Thomas F. Cooney

(57) ABSTRACT

A method of operating a mass spectrometer that allows for high-speed operation is disclosed. The method consists in separating the various steps needed to produce a mass spectrum into three or more conceptual stages in a pipeline, such that the instrument is performing steps to process more than two precursor-ion species simultaneously. In general, the number of stages in the pipeline should at least one more and, preferably, at least two more than the number of buffering storage devices in the instrument. The presently-taught methods and apparatus allow for nearly 100% duty cycle of ion accumulation for precursors of interest.

3 Claims, 8 Drawing Sheets

(56) References Cited

U.S. PATENT DOCUMENTS

| | | |
|---|---|---|
| 10,832,897 B2 | 11/2020 | Kovtoun |
| 10,852,306 B2 | 12/2020 | Coon et al. |
| 11,024,491 B2 | 6/2021 | Giannakopulos et al. |
| 11,075,063 B2 | 7/2021 | Richardson et al. |
| 11,380,531 B2 * | 7/2022 | Senko ................. H01J 49/0031 |
| 2004/0065824 A1 | 4/2004 | Bateman et al. |
| 2008/0224033 A1 | 9/2008 | Makarov |
| 2010/0042334 A1 | 2/2010 | Rardin et al. |
| 2013/0105681 A1 | 5/2013 | Kovtoun |
| 2013/0221216 A1 | 8/2013 | Makarov et al. |
| 2013/0327934 A1 | 12/2013 | Makarov et al. |
| 2015/0340212 A1 | 11/2015 | Ueda |
| 2015/0364309 A1 | 12/2015 | Welkie |
| 2016/0035549 A1 | 2/2016 | Senko et al. |
| 2016/0071709 A1 | 3/2016 | Hendricks |
| 2017/0122906 A1 | 5/2017 | Mann et al. |
| 2017/0178885 A1 | 6/2017 | Welkie |
| 2017/0372882 A1 | 12/2017 | Makarov |
| 2018/0040463 A1 | 2/2018 | Savitski et al. |
| 2018/0068838 A1 | 3/2018 | Senko et al. |
| 2019/0043705 A1 | 2/2019 | Welkie |
| 2021/0013022 A1 * | 1/2021 | Tateishi ............. H01J 49/0036 |

OTHER PUBLICATIONS

Meier et al., "Parallel Accumulation-Serial Fragmentation (PASEF): Multiplying Sequencing Speed and Sensitivity by Synchronized Scans in a Trapped Ion Mobility Device", Journal of Proteome Research 2015, 14, 5378-5387.

Senko et al., "Novel Parallelized Quadrupole/Linear Ion Trap/Orbitrap Tribrid Mass Spectrometer Improving Proteome Coverage and Peptide Identification Rates", Analytical Chemistry, Nov. 19, 2013, vol. 85, No. 24, pp. 11710-11714.

* cited by examiner

400 from Step 403, FIG. 5A

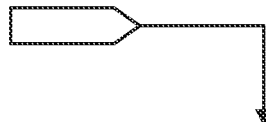

404

Concurrently with at least a portion of either the transferring of the subset of ion species or the mass analyzing of the accumulated subset of ion species, prepare the mass filtering device to transmit therethrough ion species comprising a second pre-determined $m/z$ range

405

Concurrently with at least a portion of the mass analyzing of the accumulated subset of ion species, transmit a second batch of ion species to the mass filtering device and transmit a subset of the second batch of ion species, comprising $m/z$ values within the second predetermined range, from the mass filtering device to the ion storage device and accumulate the subset of the second batch of ion species therein to Step 406, FIG. 5C

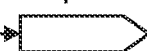

```
                    ┌─────────┐
                    │  Start  │
                    └────┬────┘
                         ▼
```

601 — Prepare a mass filtering device of a mass spectrometer system to transmit therethrough ion species comprising a pre-determined mass-to-charge ratio ($m/z$) range

602 — Transmit a first batch of ion species to the mass filtering device; transmit a subset of the first batch of ion species, comprising $m/z$ values within the predetermined range, from the mass filtering device to an ion storage device and accumulate the subset of the first batch of ion species therein

603 — Transfer the accumulated subset of the first batch of ion species to a fragmentation cell and generate a first set of fragment-ion species therein

604 — Transfer the first set of fragment-ion species to a mass analyzer and mass analyze the first set of fragment-ion species thereby to Step 605, FIG. 6B

FIG. 6A

METHODS AND APPARATUS FOR HIGH SPEED MASS SPECTROMETRY

CROSS REFERENCE TO RELATED APPLICATION

This application is a divisional of and claims, under 35 U.S.C § 120, the right of priority to co-pending and commonly-assigned U.S. patent application Ser. No. 16/678,879, titled "Methods and Apparatus for High Speed Mass Spectrometry" and filed on Nov. 8, 2019, the disclosure of which is hereby incorporated by reference herein in its entirety.

TECHNICAL FIELD

The present disclosure relates to mass spectrometers and mass spectrometry. In particular, the present disclosure relates to tandem mass spectrometry and mass spectrometers that comprise one or more ion storage devices and that are configured to perform tandem mass spectrometry.

BACKGROUND

Sensitivity, selectivity, and analytical throughput are the main figures of merit for mass spectrometers, and perhaps analytical instrumentation in general. Any advance in these areas is immediately exploited by the analytical community, often in compounded beneficial ways. For example, an improvement in sensitivity not only allows the analysis of lower concentration species, but in some cases can be used to eliminate time-consuming sample preparation steps.

The generation of a tandem mass spectrum can be decomposed into a set of steps. For example, in a first step, devices in the mass spectrometer such as power supply voltages are set to values suitable for transmitting and detecting a precursor-ion species of a particular mass-to-charge (m/z) value or a set of precursor-ion species comprising respective m/z values. In a second composite step, these precursor ions are transmitted into or through a portion of the instrument at which they are isolated and fragmented, and the fragment ions are stored in an intermediate location, possibly together with residual precursor ions. In a final step, the fragments of the precursors are analyzed by a mass analyzer (Table 1).

TABLE 1

Example of conventional steps for generating a mass spectrum

| Step Number | Process |
| --- | --- |
| 1 | Set all devices for precursor ions |
| 2 | Isolate/Fragment/Store precursor ions |
| 3 | Analyze fragments of precursor ions |

The traditional and most intuitive way to operate a mass spectrometer is by sequentially performing all of the required steps, from first step to last step, with respect to a first set of precursor ion species and, after the final step has been executed, repeating all of the steps with respect to a next set of ion species that are different than the prior set of ion species. An example of this type of scheme is shown generally at 10 in FIG. 1 in which boxes 1a and 1b represent setup steps, boxes 2a and 2b represent ion injection steps, boxes 3a and 3b represent ion transfer steps and boxes 4a and 4b represent mass analysis steps. The time period 5 encompasses the steps that produce mass spectral data of a first batch of analyte-ion species and the time period 6 encompasses the steps that produce mass spectral data of a second, different batch of analyte-ion species. The sequence and timing of steps may be controlled by electronic controller or computer 31 via control of the specific mass spectrometer hardware components (not shown in FIG. 1) that are used to perform the various steps.

The required setup time (e.g., widths of boxes 1a and 1b of FIG. 1) is generally controlled by the amount of time required to configure a quadrupole mass filter (QMF) so as to transmit precursor ions within a particular desired m/z range. This setup time depends upon the magnitude of the m/z range over which the QMF must slew to achieve a new configuration after previously having been in a configuration to preferentially transmit ions within a different m/z range. The injection time (e.g., widths of boxes 2a and 2b) is the time required to accumulate and fragment the selected precursor ions in a fragmentation cell, such as a collision-induced dissociation (CID) cell, of the type that temporarily stores the fragment ions. Other types of fragmentation cells include those within which fragmentation occurs by electron capture dissociation (ECD), electron transfer dissociation (ETD), surface-induced dissociation (SID), photo-induced dissociation, etc. This accumulation and fragmentation process generally requires a few tens of milliseconds. Although the fragmentation cell requires its own setup prior to receiving precursor ions, there is no need to consider this fragmentation-cell setup time because it is significantly shorter than the QMF setup time. Thus, the time required, if any, to setup and prepare the fragmentation cell to receive ions may be conveniently absorbed into the setup time indicated by boxes 1a and 1b. The time required to transfer ions from a CID cell to a mass analyzer is represented by the widths of boxes 3a and 3b and the time required for mass analysis is represented by the widths of boxes 4a and 4b. While the approach represented in FIG. 1 has been very successful due to the high selectivity of the combined processes of isolation and fragment analysis, it tends to discard a great majority of the ion beam.

One of the new frontiers in sensitivity improvement lies in the utilization of all the ions admitted to the instrument in order to take advantage of the fact that the ion stream comprises, at any given time, ions of all compounds of the sample that has been ionized. Senko (Analytical Chemistry, 2013, 85 (24), 11710-11714) described how a general directional ion pathway through a mass spectrometer, from ion source to mass analyzer, may be favorably analogized as a segmented "pipeline" in which each segment executes one of the various process steps. In this context, an "analyte-derived ion species" (either a precursor ion generated from an analyte molecule at an ion source or a fragment of such a molecule generated in a fragmentation cell) may be conceptualized as an object that passes through each segment, is acted upon by the processing stage that corresponds to that segment, and is passed to the next stage. The most important aspect of the pipeline analogy is that different batches of analyte-derived ion species may simultaneously occupy different mass spectrometer pathway segments, each segment corresponding to a different respective step of an overall process. Accordingly, different process steps performed may be executed simultaneously, where each process step may be specifically configured to operate in accordance with the particular analyte-derived ion species that occupy the path segment at which that step is executed.

According to the pipeline concept taught by Senko, a mass spectrometer system may effectively perform processing steps relating to two or more batches of analyte-ion species at the same time. An example a two-stage parallel processing scheme, as taught by Senko, is depicted generally at 20 in FIG. 2. In this context, an "analyte-ion species" is either a precursor-ion species generated by ionization of a chemical analyte or else a fragment-ion species generated by one or more instances of fragmentation of such a precursor-ion species. In this context, a "batch of analyte-ion species" is a plurality of analyte-ion species, as defined above, that are generated by simultaneous ionization of one or more chemical analytes and that are processed together in a mass spectrometer system. In this context, a "stage" is either a single process step or a set of one or more consecutive process steps that are applied to an individual batch of analyte-ion species, as defined above. Some process steps may be simple ion storage steps. The number of stages of any particular mass spectrometer parallel processing scheme is the maximum number of batches of ion species that that may be present in the general ion pathway (the pipeline) of the mass spectrometer at any given time.

In FIG. 2, boxes 1a, 1b and 1c represent mass spectrometer setup steps that pertain to first, second and third batches of analyte-ion species, respectively. Likewise, boxes 2a, 2b and 2c of FIG. 2 represent ion injection steps that pertain, respectively, to the first, second and third batches of analyte-ion species. Similarly, boxes 3a, 3b and 3c of FIG. 2 represent ion transfer steps that pertain, respectively, to the first, second and third batches of analyte-ion species. Finally, boxes 4a, 4b and 4c of FIG. 2 represent mass analysis steps that pertain, respectively, to the first, second and third batches of analyte-ion species. Each "inject stage" comprises a single pair of setup and injection steps such as, for example, the pair of steps represented by boxes 1a and 2a. Each "analysis stage" comprises a single pair of transfer and analysis steps, such as, for example, the pair of steps represented by boxes 3a and 4a.

It can be appreciated that parts of the mass spectrometer system that perform the Setup and Inject steps may partially overlap with parts of the instrument that perform the Transfer and Analyze steps. For instance, it is possible that Setup and Inject steps cannot start until after a storage cell has been emptied of a prior batch of ions. In the example of FIG. 2, this is illustrated as a lack of overlap, along the time axis, between box 3a and box 1b and between box 3b and box 1c. Thus, while there may be partial overlap between stages (thus improving duty cycle), each stage may not necessarily be totally independent of the other stages. The question of whether or not certain portions of stages can (or cannot) overlap will be apparatus dependent. The present inventors have realized that multi-stage pipeline operation, where the number of stages is three or greater, may improve efficiency still further.

SUMMARY

Against the above background, a method of operating a mass spectrometer that allows for high-speed operation is disclosed. The method consists in separating the various steps needed to produce a mass scan into three or more conceptual stages in a pipeline, such that the instrument is performing steps to process more than two precursor-ion species simultaneously. In general, the number of stages in the pipeline should be at least one more and, preferably, at least two more than the number of storage devices in the instrument, where the storage devices act to "buffer" the flow of ions between mass spectrometer components in a fashion that is analogous to the way computer memory segments are used to buffer the transfer of bytes of information between computer hardware devices. The presently-taught methods and apparatus allow for nearly 100% duty cycle of ion accumulation for precursors of interest.

According to a first aspect, the present teachings provide a mass spectrometry method, comprising: (i) preparing a mass filtering device of a mass spectrometer system to transmit therethrough ion species comprising a pre-determined range of mass-to-charge ratio (m/z) values; (ii) transmitting a first batch of ion species to the mass filtering device and transmitting a subset of the first batch of ion species from the mass filtering device to an ion storage device of the mass spectrometer system and accumulating the subset of the first batch of ion species within the ion storage device, the transmitted subset of the first batch of ion species comprising m/z values within the predetermined range; (iii) transferring the accumulated subset of the first batch of ion species to a mass analyzer of the mass spectrometer system and mass analyzing the accumulated subset of the first batch of ion species using the mass analyzer; (iv) concurrently with at least a portion of either the transferring of the accumulated subset of the first batch of ion species to the mass analyzer or the mass analyzing of the accumulated subset of the first batch of ion species, preparing the mass filtering device to transmit therethrough ion species comprising a second pre-determined range of m/z values; (v) concurrently with at least a portion of the mass analyzing of the accumulated subset of the first batch of ion species, transmitting a second batch of ion species to the mass filtering device and transmitting a subset of the second batch of ion species from the mass filtering device to the ion storage device and accumulating the subset of the second batch of ion species within the ion storage device, the transmitted subset of the second batch of ion species comprising m/z values within the second predetermined range of m/z values; and (vi) concurrently with at least a portion of the mass analyzing of the accumulated subset of the first batch of ion species, preparing the mass filtering device to transmit therethrough ion species comprising a third pre-determined range of m/z values.

According to some embodiments, the method may further comprise (vii) transferring the accumulated subset of the second batch of ion species to the mass analyzer and mass analyzing the accumulated subset of the second batch of ion species using the mass analyzer; and (viii) concurrently with at least a portion of either the transferring or the mass analyzing of the accumulated subset of the second batch of ion species, transmitting a third batch of ion species to the mass filtering device and transmitting a subset of the third batch of ion species from the mass filtering device to the ion storage device and accumulating the subset of the third batch of ion species within the ion storage device, the transmitted subset of the third batch of ion species comprising m/z values within the third predetermined range of m/z values.

According to a second aspect, the present teachings provide a mass spectrometry method, comprising: (i) preparing a mass filtering device of a mass spectrometer system to transmit therethrough ion species comprising a pre-determined range of mass-to-charge ratio (m/z) values; (ii) transmitting a first batch of ion species to the mass filtering device and transmitting a subset of the first batch of ion species from the mass filtering device to an ion storage device of the mass spectrometer system and accumulating the subset of the first batch of ion species within the ion storage device, the transmitted subset of the first batch of ion species comprising m/z values within the predetermined range; (iii) transferring the accumulated subset of the first batch of ion species to a fragmentation cell of the mass spectrometer system, the fragmentation cell generating a first set of fragment-ion species from the subset of the first batch of ion species; (iv) transferring the first set of fragment-ion species to a mass analyzer of the mass spectrometer system and mass analyzing the first set of fragment-ion species using the mass analyzer; (v) concurrently with at least a portion of either the generating of the first set of fragment-ion species or the mass analyzing of the first set of fragment-ion species, preparing the mass filtering device to transmit therethrough ion species comprising a second pre-determined range of m/z values; (vi) concurrently with at least a portion of either the generating of the first set of fragment-ion species or the mass analyzing of the first set of fragment-ion species, transmitting a second batch of ion species to the mass filtering device and transmitting a subset of the second batch of ion species from the mass filtering device to the ion storage device and accumulating the subset of the second batch of ion species within the ion storage device, the transmitted subset of the second batch of ion species comprising m/z values within the second predetermined range of m/z values; and (vii) concurrently with at least a portion of the mass analyzing of the first set of fragment-ion species, preparing the mass filtering device to transmit therethrough ion species comprising a third pre-determined range of m/z values.

According to a third aspect, the present teachings provide a mass spectrometer system, comprising: (a) an ion source; (b) a mass filtering device configured to receive ions from the ion source; (c) an ion storage device configured to receive and accumulate mass-filtered ions received from the mass filtering device; (d) a mass analyzer configured to receive ions from the ion storage device; and (e) a computer or electronic controller electrically coupled to the mass filtering device, the ion storage device and the mass analyzer, the computer or electronic controller comprising computer-readable program instructions operable to: (1) prepare the mass filtering device to transmit therethrough ion species comprising a pre-determined range of mass-to-charge ratio (m/z) values; (2) cause the ion source to transmit a first batch of ion species to the mass filtering device, cause the mass filtering device to transmit a subset of the first batch of ion species to the ion storage device, and cause the ion storage device to accumulate the subset of the first batch of ion species therein, whereby the transmitted subset of the first batch of ion species comprises m/z values within the predetermined range; (3) cause the ion storage device to transfer the accumulated subset of the first batch of ion species to the mass analyzer, whereby the ion species of the accumulated subset of the first batch of ion species are mass analyzed; (4) prepare the mass filtering device to transmit therethrough ion species comprising a second pre-determined range of m/z values, wherein said preparing is concurrent with at least a portion of either the transferring of the subset of ion species or the mass analyzing of the accumulated subset of ion species; (5) cause the ion source to transmit a second batch of ion species to the mass filtering device, cause the mass filtering device to transmit a subset of the second batch of ion species and cause the ion storage device to accumulate the subset of the second batch of ion species therein, whereby the transmitted subset of the second batch of ion species comprises m/z values within the second predetermined range, wherein said transmitting and accumulating are concurrent with at least a portion of the mass analyzing of the accumulated subset of ion species; and (6) prepare the mass filtering device to transmit therethrough ion species comprising a third pre-determined m/z range, wherein said preparing is concurrent with at least a portion of the mass analyzing of the accumulated subset of the first batch of ion species.

According to a fourth aspect, the present teachings provide a mass spectrometer system, comprising: (a) an ion source; (b) a mass filtering device configured to receive ions from the ion source; (c) an ion storage device configured to receive and accumulate mass-filtered ions received from the mass filtering device; (d) a fragmentation cell configured to receive accumulated mass-filtered ions from the ion storage device; (e) a mass analyzer configured to receive fragment ions from the fragmentation cell; and (f) a computer or electronic controller electrically coupled to the mass filtering device, the ion storage device, the fragmentation cell and the mass analyzer, the computer or electronic controller comprising computer-readable program instructions operable to: (1) prepare the mass filtering device to transmit therethrough ion species comprising a pre-determined range of mass-to-charge ratio (m/z) values; (2) cause the ion source to transmit a first batch of ion species to the mass filtering device, cause the mass filtering device to transmit a subset of the first batch of ion species to the ion storage device, and cause the ion storage device to accumulate the subset of the first batch of ion species therein, whereby the transmitted subset of the first batch of ion species comprises m/z values within the predetermined range; (3) cause the ion storage device to transfer the accumulated subset of the first batch of ion species to the fragmentation cell, whereby the fragmentation cell generates a first set of fragment-ion species from the subset of the first batch of ion species; (4) cause the fragmentation cell to transfer the first set of fragment-ion species to the mass analyzer, whereby the first set of fragment-ion species are mass analyzed; (5) prepare the mass filtering device to transmit therethrough ion species comprising a second pre-determined range of m/z values, wherein said preparing is concurrent with at least a portion of either the generating of the first set of fragment-ion species or the mass analyzing of the first set of fragment-ion species; (6) cause the ion source to transmit a second batch of ion species to the mass filtering device, cause the mass filtering device to transmit, to the ion storage device, a subset of the second batch of ion species comprising m/z values within the second predetermined range and cause the ion storage device to accumulate the subset of the second batch of ion species therein, wherein the transmitting and accumulating is concurrent with at least a portion of either the generating of the first set of fragment-ion species or the mass analyzing of the first set of fragment-ion species; and (7) prepare the mass filtering device to transmit therethrough ion species comprising a third pre-determined range of m/z values, wherein said preparing is concurrent with at least a portion of the mass analyzing of the first set of fragment-ion species.

In accordance with another aspect, the present teachings provide a mass spectrometry method comprising: mass analyzing a first discrete batch of ions in a mass analyzer of a mass spectrometer system; storing a second discrete batch of ions within an ion storage device or a fragmentation cell of the mass spectrometer system, wherein the storage of the second discrete batch of ions is concurrent with at least a portion of the mass analyzing of the first discrete batch of ions; and preparing an additional component of the mass spectrometer system to receive a third batch of ions from an ion source of the mass spectrometer system, wherein the preparing of the additional component is concurrent with at least a portion of the storage of the second discrete batch of ions within the ion storage device or fragmentation cell.

BRIEF DESCRIPTION OF THE DRAWINGS

The above noted and various other aspects of the present invention will become apparent from the following description which is given by way of example only and with reference to the accompanying drawings, not necessarily drawn to scale, in which:

FIGS. 5A-5C illustrate a flow diagram of a first method for operating a mass spectrometer in accordance with the present teachings; and FIGS. 6A-6C illustrate a flow diagram of a second method for operating a mass spectrometer in accordance with the present teachings.

DETAILED DESCRIPTION

Figure 1:
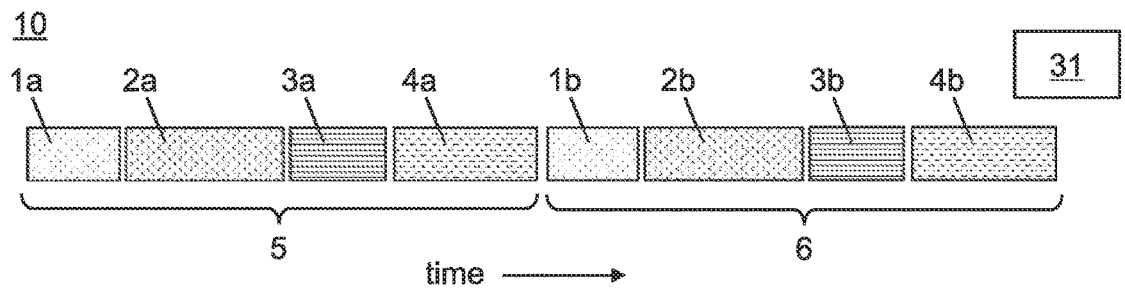
FIG. 1 is a schematic depiction of operation of a mass spectrometer in accordance with a single-stage processing pipeline.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1-4, 5A-5C and 6A-6C in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. In addition, reference numerals may be repeated among the various figures to show corresponding or analogous elements. Additionally, it will be understood that any list of such candidates or alternatives is merely illustrative, not limiting, unless implicitly or explicitly understood or stated otherwise.

Unless otherwise defined, all other technical and scientific terms used herein have the meaning commonly understood by one of ordinary skill in the art to which this invention belongs. In case of conflict, the present specification, including definitions, will control. It will be appreciated that there is an implied "about" prior to the quantitative terms mentioned in the present description, such that slight and insubstantial deviations are within the scope of the present teachings. In this application, the use of the singular includes the plural unless specifically stated otherwise. In addition, the use of "comprise", "comprises", "comprising", "contain", "contains", "containing", "include", "includes", and "including" are not intended to be limiting. As used herein, "a" or "an" also may refer to "at least one" or "one or more." Also, the use of "or" is inclusive, such that the phrase "A or B" is true when "A" is true, "B" is true, or both "A" and "B" are true.

It has not previously been appreciated that the number of stages in the processing queue can be still further increased to yield even shorter total mass spectrum acquisition periods. It has also not previously been appreciated that there is a general rule that can be followed to yield the smallest appropriate number of stages for a particular mass spectrometer system. As noted below, the minimum number of processing stages for any particular mass spectrometer system is highly dependent on the hardware configuration of that system. Beneficially, provision of increasing numbers of ion storage devices (e.g., ion traps) within a mass spectrometer system creates greater possibilities for increasing the number of processing stages. For example, Senko et al. (Analytical chemistry 85, no. 24 (2013): 11710-11714) describe a hybrid mass spectrometer system that is schematically depicted at 150 in FIG. 3 of this application. The mass spectrometer 150, variations of which are commercially available from Thermo Fisher Scientific of Waltham, Massachusetts USA, comprises more than one type of mass analyzer and more than one storage device. Specifically, the mass spectrometer 150 includes a linear ion trap mass analyzer 216 as well as an Orbitrap™ analyzer 212. In operation of the mass spectrometer system 150, an electrospray ion source 201 provides ions of a sample to be analyzed. A quadrupole mass filter 208 of the mass spectrometer 150 is used in its conventional sense as a tunable mass filter so as to pass ions only within a selected narrow m/z range. The filtered ions are delivered to a curved quadrupole ion trap ("C-trap") component 210. The C-trap 210 is able to transfer ions along a pathway between the quadrupole mass filter 208 and the linear ion trap mass analyzer 216. The C-trap 210 also has the capability to temporarily collect and store a population of ions and then deliver the ions either to the linear ion trap mass analyzer 216 or to the Orbitrap™ mass analyzer 212, in the latter case, as a pulse or packet. The transfer of packets of ions is controlled by the application of electrical potential differences between the C-trap 210 and a set of injection electrodes 211 disposed between the C-trap 210 and the Orbitrap™ mass analyzer 212. The curvature of the C-trap is designed such that the population of ions is spatially focused so as to match the angular acceptance of an entrance aperture of the Orbitrap™ mass analyzer 212.

Multipole ion guide 214 serves to either guide ions between the C-trap 210 and the ion trap mass analyzer 216 or, alternatively, to store ions and provide the stored ions (precursor ions and/or fragment ions) back to the C-trap 210 (from which they may be injected into the Orbitrap™ mass analyzer 212) or forward to the linear ion trap mass analyzer 216. Generally, the multipole ion guide 214 provides additional temporary ion storage capability such that ions produced in a first processing step of an analysis method can be later retrieved for processing in a subsequent step. The multipole ion guide 214 can also serve as a fragmentation cell. Because of the versatility of the multipole ion guide 214 positioned as shown, this apparatus is referred to as an ion-routing multipole device. Various gate electrodes along the pathway between the C-trap 210 and the ion trap mass analyzer 216 are controllable such that ions may be transferred in either direction, depending upon the sequence of ion processing steps required in any particular analysis method.

The linear ion trap mass analyzer 216 is a dual-pressure quadrupole linear ion trap (i.e., a two-dimensional trap) comprising a high-pressure linear trap cell 217a and a low-pressure linear trap cell 217b, the two cells being positioned adjacent to one another separated by a plate lens having a small aperture that permits ion transfer between the two cells and that serves as a gas pumping restriction that allows different pressures to be maintained in the two traps. The environment of the high-pressure cell 217a favors ion cooling, ion fragmentation by either collision-induced dissociation or electron transfer dissociation or ion-ion reactions such as proton-transfer reactions. The environment of the low-pressure cell 217b favors analytical scanning with high resolving power and mass accuracy. The low-pressure cell includes a dual-dynode ion detector 215.

Figure 2:
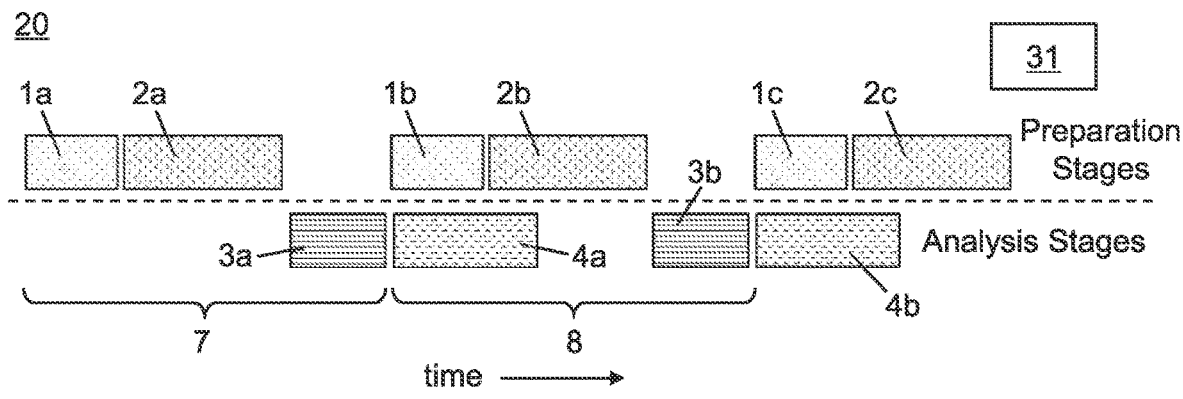
FIG. 2 is a schematic depiction of operation of a mass spectrometer in accordance with a double-stage processing pipeline.
Figure 4:
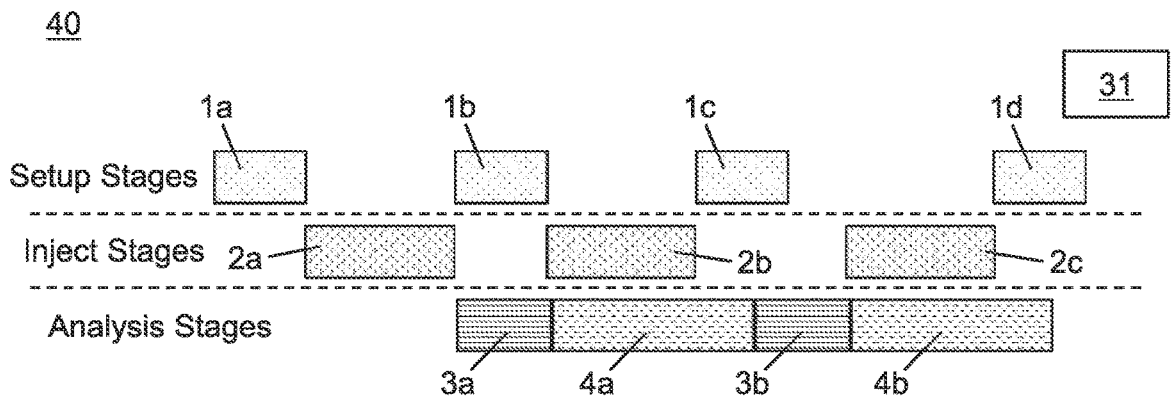
FIG. 4 is a schematic depiction of operation of a mass spectrometer in accordance with a triple-stage processing pipeline, wherein the mass spectrometer comprises an ion source, a mass filter, a fragmentation or storage cell and a mass analyzer.
Figure 3:
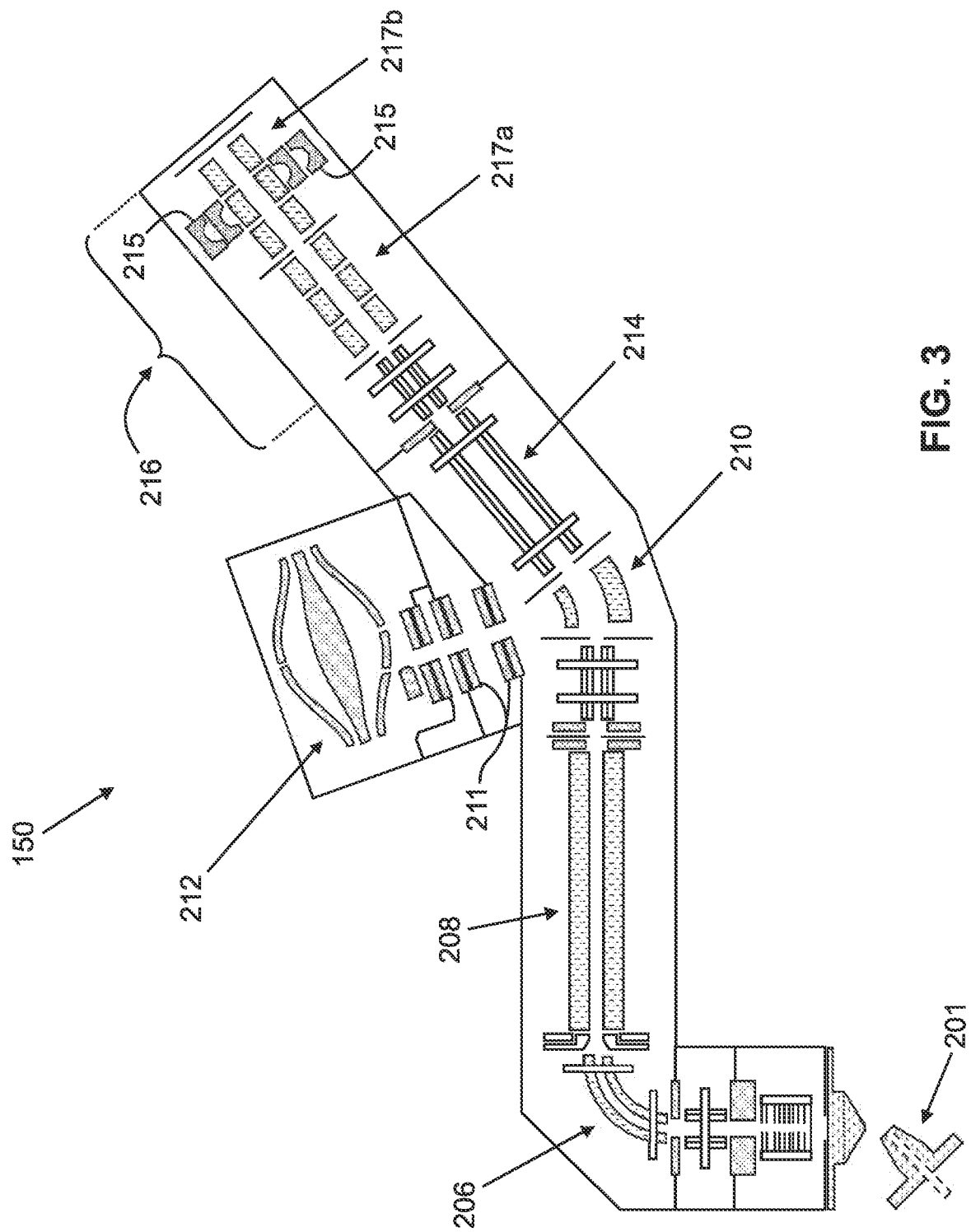
FIG. 3 is a schematic depiction of a known mass spectrometer system.

With regard to the mass spectrometer system 150 that is depicted in FIG. 3, ion processing should proceed using a minimum of three stages (e.g. FIG. 4) instead of using two stages in previously-known fashion (FIG. 2). In FIG. 4, steps 1a-1d are Setup steps, steps 2a-2c are Inject steps, steps 3a-3b are Transfer steps and steps 4a-4b are Analyze steps. With regard to the mass spectrometer system 150, steps 1a-1d relate to setup of all ion optical components of the mass spectrometer that are between the ion source and the ion-routing multipole device 214. This setup time will generally include the setup of the ion-routing multipole device 214 itself, which is here used as an ion storage device and possibly also as a fragmentation cell. Generally, the total time required to setup all of these devices, as indicated by the widths of the boxes representing steps 1a-1d, is dominated by the setup time of the quadrupole mass filter 208. Steps 2a-2c relate to accumulation of batches of precursor ions and fragmentation of those precursor ions in the ion-routing multipole device 214. Likewise, the steps 3a-3b and 4a-4b relate, respectively, to transfer of ions to and analysis of those ions within a chosen one of the two mass analyzers. The time required for the Analyze steps 4a-4b, as indicated by the widths of the boxes corresponding to those steps, depends upon many factors including, the choice of analyzer, the m/z range of the mass scan or mass analysis and the precision of the mass scan or mass analysis. For fast-scanning applications, the ion trap mass analyzer 216 will often be chosen for analysis purposes. The mass spectrometer system 150 is configured such that the Setup step for a third analyte-ion species (e.g., box 1c in FIG. 4) can occur at the same time that a previous Analyze step (e.g., box 4a in FIG. 4) is being executed for a first analyte-ion species. This scheme further compresses the total period required to produce a mass spectrum, to the greater of the Transfer+Inject steps and the Transfer+Analyze steps, assuming that the Setup step is shorter than the Transfer step (as is assumed in FIG. 4). Otherwise, the total period is the greater of the Setup+Inject and Setup+Analyze steps. The Setup or Transfer step can take on the order of 1-2 ms, which is a significant time savings when fast scanning above 100 Hz is desired, where the total scan period is less than 10 ms.

These considerations lead us to the general rule that, for good results, the number of stages in the processing queue should be at least one more than and, ideally, two more than the number of storage cells disposed upstream from the mass analyzer segment (which corresponds to the Analyze step, which is usually the lengthiest process step). Such a storage cell could be said to be a "buffering" storage cell, because the process steps that occur downstream from the storage cell, including the Analyze step, requires a significant time period compared to the time to fill the storage cell. For example, consider a mass spectrometer system instrument consisting of the following segments: an ion source; a quadrupole mass filter; a fragmentation/storage cell; and a mass analyzer. It is often the case that the Analyze step requires the longest time for completion. Thus, in such a system, the fragmentation/storage cell is the only storage device upstream from the mass analyzer. Accordingly, for fast operation, the system should be operated with at least two process stages (e.g., FIG. 2) and, preferably, three process stages as described above with regard to FIG. 4. Since the mass spectrometer system 150 of FIG. 3 includes at least two other ion storage components (C-trap 210 and high-pressure linear trap cell 217a) in addition to the ion routing multipole device 214, this system offers additional opportunities for performing complex operations that include greater than three process stages.

Figure 5A:
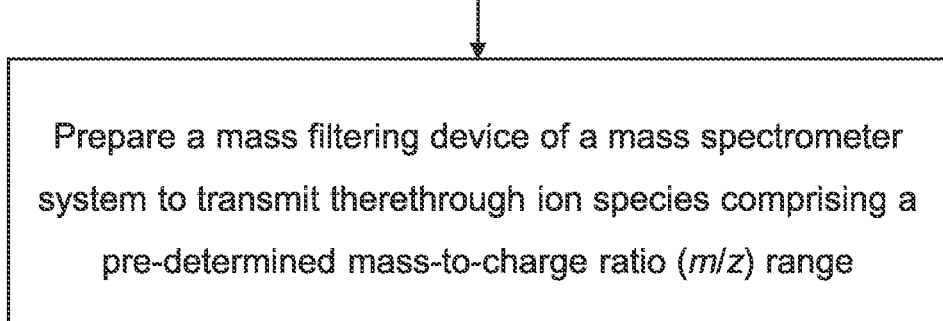
Figure 5A:
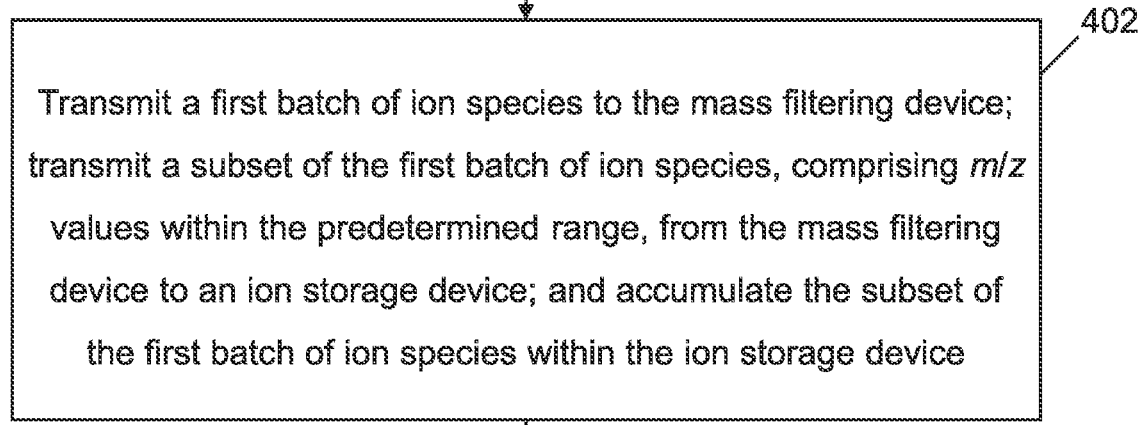
Figure 5A:
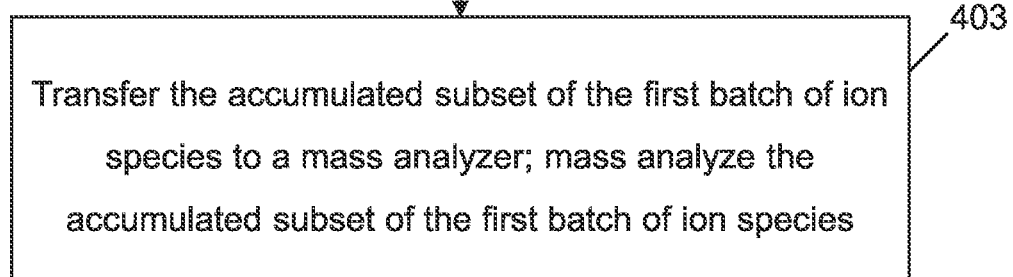
Figure 5C:
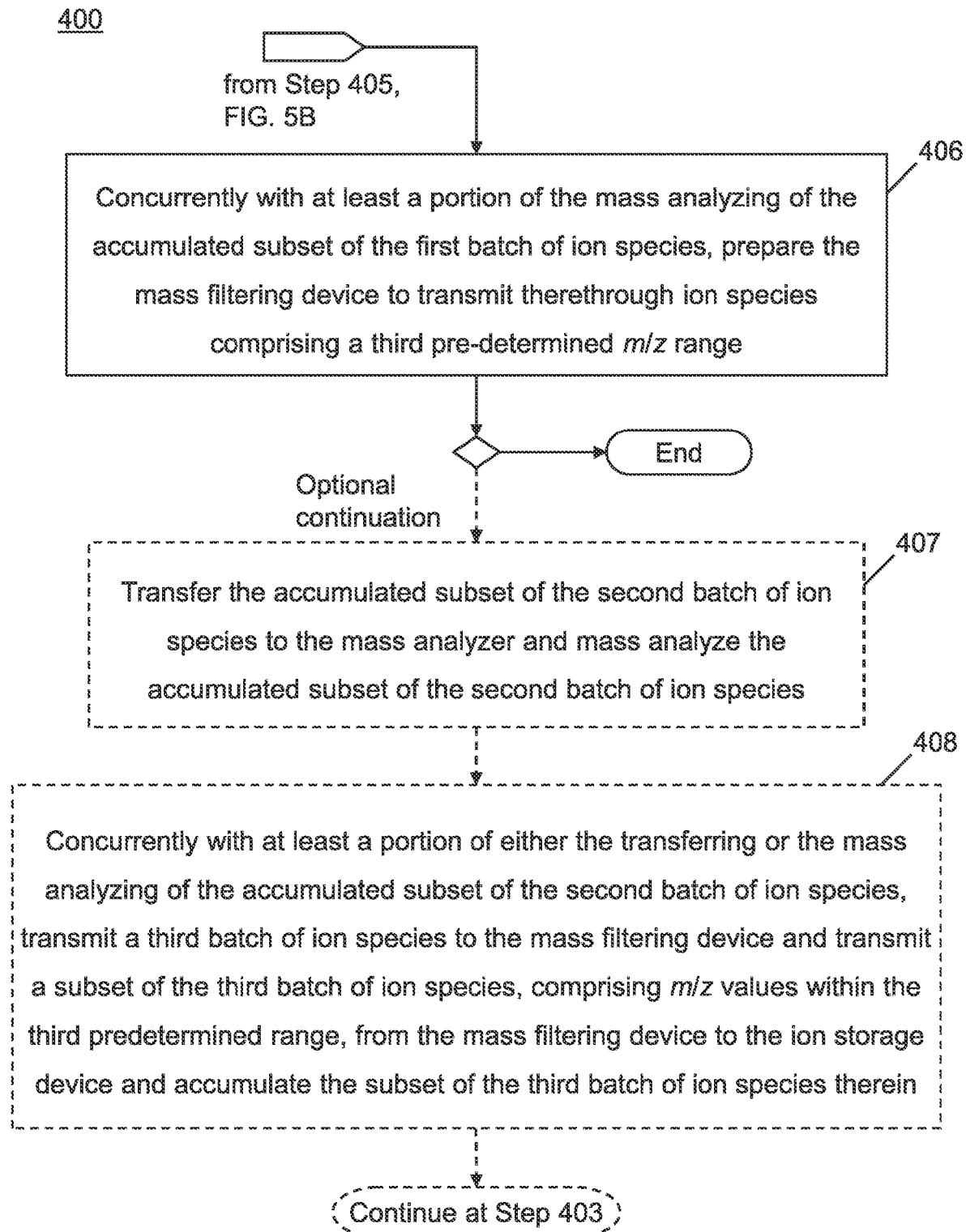

FIGS. 5A-5C illustrate a flow diagram of a first method (method 400) for operating a mass spectrometer in accordance with the present teachings. This method may be carried out, either fully automatically or semi-automatically, by any mass spectrometer system that includes the appropriate hardware and software and/or firmware (ion source, mass analyzer, mass filtering device, ion storage device, ion routing and gating components, power supply, vacuum system, computer or other electronic controller provided with instructions to perform the method, electrical connections, etc.). Thus, the following description of method 400 also implicitly describes a mass spectrometer system that is so equipped.

Step 401, of the method 400 (FIG. 5A) comprises preparing a mass filtering device of a mass spectrometer system to transmit therethrough ion species comprising a pre-determined range of mass-to-charge ratios (m/z). The preparation may include adjusting RF and DC voltages that are applied to electrodes of the mass filtering device in order to adjust a pass band of the device so as to match the pre-determined m/z range. In Step 402, a first batch of ion species is transmitted to the mass filtering device from an ion source. On passing through the mass filtering device, ions of the first batch that have m/z values that are outside of pre-determined m/z range are ejected from the device. Consequently, only ion species comprising m/z values within the predetermined range, are able to pass completely through the mass filtering device and, upon exiting the mass filtering device, from the mass filtering device to an ion storage device. These ion species comprise a subset of the ion species originally transmitted from the ion source to the mass filtering device. This subset of the ion species of the first batch of ions are allowed to accumulate within the ion storage device. Step 403 of the method 400 comprises transferring the accumulated subset of the first batch of ion species to a mass analyzer at which the subset of the ion species of the first batch are mass analyzed.

Step 404 of the method 400 (FIG. 5B) comprises preparing the mass filtering device to transmit therethrough ion species comprising a second pre-determined m/z range, wherein this preparing step is executed concurrently with at least a portion of either the transferring of the subset of ion species or the mass analyzing of the accumulated subset of ion species (Step 403). The preparation in Step 404 may include re-adjusting the RF and DC voltages that are applied to electrodes of the mass filtering device in order to change the pass band of the device so as to match the second pre-determined m/z range. Step 405 comprises the operations of transmitting a second batch of ion species to the mass filtering device; transmitting a subset of the second batch of ion species, comprising m/z values within the second predetermined range, from the mass filtering device to the ion storage device; and accumulating the subset of the second batch of ion species therein. Thus, the operations of Step 405 are analogous to the operations of Step 402, but with a different pass band of the mass filtering device. According to the method, the operations of Step 405 are executed concurrently with at least a portion of the mass analyzing of the accumulated subset of ion species (Step 403). Step 406 (FIG. 5C) comprises prepare the mass filtering device to transmit therethrough ion species comprising a third pre-determined m/z range, where this preparing step also occurs concurrently with at least a portion of the mass analyzing of the accumulated subset of the first batch of ion species (Step 403).

During the period of concurrency between the execution of Step 406 and the mass analyzing of the accumulated subset of the first batch of ion species, ions derived from the first batch of ion species are within a mass analyzer and ions derived from the second batch of ion species are within an ion storage device. At the same time, a mass filtering device is being prepared to selectively transmit ion species from a third batch of ions. The mass analyzing operation, ion storage operation and mass filtering preparation are therefore portions of third, second and first stages of operations, respectively. The preparation operation of Step 406 establishes the entranceway for a new "pipeline" for a next batch of ions. Ion species from each batch of ions pass through all three stages of operation during their respective processing in the mass spectrometer that includes the mass filtering, mass storage and mass analyzer devices. Accordingly, Steps 401-406 of the method 400 fully describe three-stage mass spectrometer operation.

It should be clear from the introductory discussions supra that, in general, ions derived from many additional batches of ions will be subjected to the same sequence of processing stages, with the batches being repetitively introduced into the mass spectrometer. Steps 401-406 merely describe one iteration of the process. Steps 407 and 408, shown in FIG. 5C, comprise the next steps in such an iterative procedure. In Step 407, the accumulated subset of the second batch of ion species is transferred to the mass analyzer and mass analyzed therein. In Step 408, which is executed concurrently with at least a portion of either the transferring or the mass analyzing of the accumulated subset of the second batch of ion species (Step 407), a third batch of ion species is transmitted to the mass filtering device and filtered thereby. Accordingly, a subset of the third batch of ion species, comprising m/z values within the third predetermined range is accumulated in the ion storage device. Execution of the method 400 may then return to the operations at and sequentially following Step 403, with the accumulated subset of the third batch of ion species replacing "the accumulated subset of the first batch of ion species" and mutatis mutandis.

Figure 6B:
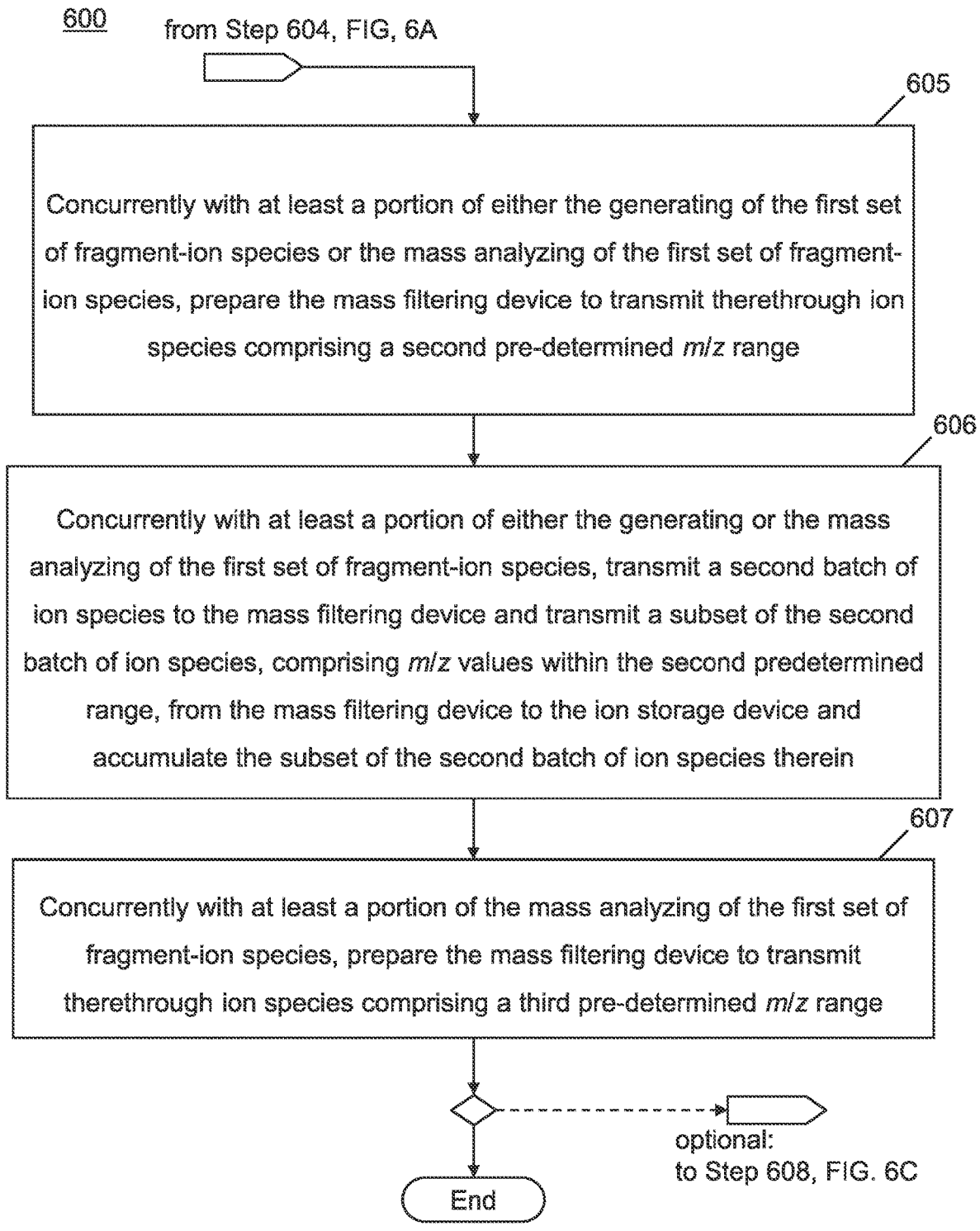
Figure 6C:
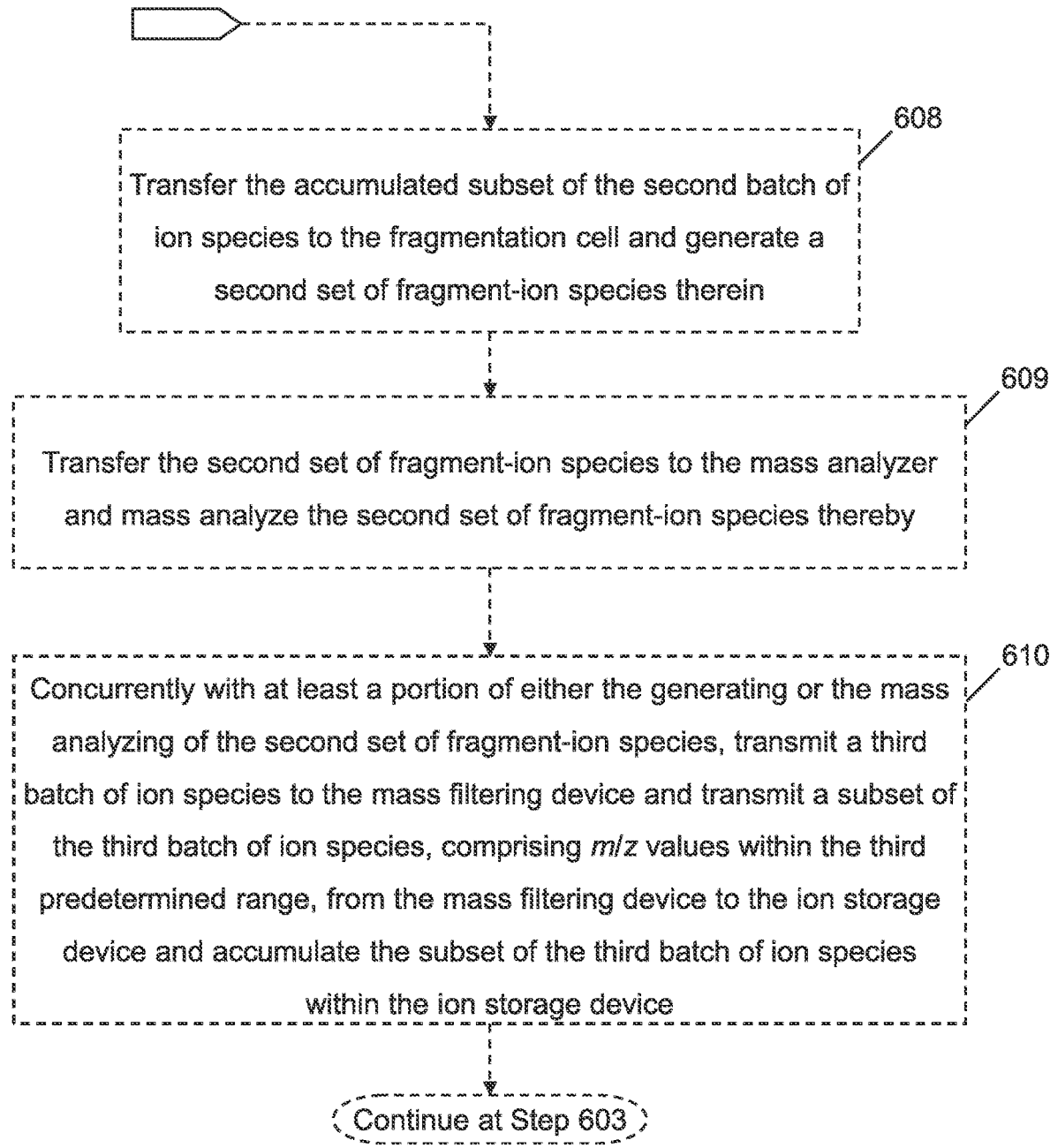

FIGS. 6A-6C illustrate a flow diagram of a second method (method 600) for operating a mass spectrometer in accordance with the present teachings. The sequence of operations of the method 600 is generally analogous to the sequence of operations of the method 400 except that the method 600 pertains to a mass spectrometer system that includes a fragmentation cell in addition to a mass filtering device and a mass storage device. According to the method 600, accumulated subsets of various batches of ion species are transferred from the ion storage device to the fragmentation cell (Step 603, Step 608), thereby generating respective sets of fragment-ion species. The fragment-ion species are then transferred to a mass analyzer for mass analysis (Step 604, Step 609). Steps 601-607 (FIGS. 6A-6B) merely describe one iteration of a possibly iterated procedure. Steps 608-610, shown in FIG. 6C, comprise the next steps in such an iterative procedure. The method 600 may be carried out, either fully automatically or semi-automatically, by any mass spectrometer system that includes the appropriate hardware and software and/or firmware (ion source, mass analyzer, mass filtering device, ion storage device, fragmentation cell, ion routing and gating components, power supply, vacuum system, computer or other electronic controller provided with instructions to perform the method, electrical connections, etc.). Thus, the description of method 600, as outlined in FIGS. 6A-6C, also implicitly describes a mass spectrometer system that is so equipped.

Improved systems and methods have been herein disclosed for improving mass spectrometer efficiency. The discussion included in this application is intended to serve as a basic description. The present invention is not intended to be limited in scope by the specific embodiments described herein, which are intended as single illustrations of individual aspects of the invention. Instead, the invention is limited only by the claims. Functionally equivalent methods and components are considered to be within the scope of the invention.

Various modifications may relate to the specific sequence of operations that occur during mass analysis. For example, the above-mentioned accumulation and fragmentation steps may relate to one another by various different sequences. According to some mass spectrometer configurations or experimental requirements, precursor ions (of either one species or a plurality of species) may be first accumulated in an ion storage device prior to their fragmentation in a fragmentation cell. According to some other mass spectrometer configurations or experimental requirements, a continuous stream of precursor ions (of either one species or a plurality of species) may be directed into an entrance aperture of a fragmentation cell whereupon fragment ions are formed by fragmentation of the precursor ions during their movement through the cell. Under such circumstances, a continuous stream of fragment-ion species may emerge from an outlet aperture of the fragmentation cell. The fragment ions that emerge from the fragmentation cell may then be transferred directly to a mass analyzer for mass analysis or, alternatively, may be accumulated and temporarily stored in an ion storage device prior to mass analysis. In yet other instances, a single mass spectrometer component may serve as both a fragmentation cell and an ion accumulation and storage device. Upon or after entering such a component, precursor ions may be fragmented by any known fragmentation technique whereupon fragment ions are generated. If the single component is a linear ion trap, then the so-generated fragment ions may be retained within and accumulated within the same apparatus by an imposition of a longitudinal DC electrical potential well in addition to a lateral RF confining voltage. In such circumstances, the various steps of precursor-ion transfer, precursor-ion fragmentation and fragment-ion accumulation may be considered to all occur simultaneously, instead of sequentially. Finally, some mass analyzer apparatuses, such as quadrupole ion traps and three-dimensional traps are capable of performing tandem-in-time mass analyses. In such instances, a mass analyzer may also function as an ion storage device and a fragmentation cell.

Such modifications and other modifications are intended to fall within the scope of the appended claims. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A mass spectrometer system, comprising:
   (a) an ion source;
   (b) a mass filtering device configured to receive ions from the ion source;
   (c) an ion storage device;
   (d) a mass analyzer; and
   (f) a computer or electronic controller electrically coupled to the mass filtering device, the ion storage device and the mass analyzer, the computer or electronic controller comprising computer-readable program instructions operable to:
      (1) cause the mass analyzer to mass analyze a first discrete batch of ions generated by the ion source, the first discrete batch of ions comprising a first mass-to-charge ratio (m/z) range;
      (2) cause the ion storage device to store a second discrete batch of ions therein, wherein said storing of the second discrete batch of ions is concurrent with at least a portion of the mass analyzing of the first discrete batch of ions; and
      (3) cause a transmission range of the mass filtering device to slew to a second m/z range from a prior m/z range that is different than the second m/z range in preparation to receive a third batch of ions from the ion source, wherein the clewing of the mass filtering device is concurrent with at least a portion of the mass analysis of the first discrete batch of ions and wherein m/z values of the third batch of ions are within the second m/z range.

2. A mass spectrometer system as recited in claim 1, wherein the computer-readable program instructions are further operable to:
   (4) cause a transfer of the second discrete batch of ions to the mass analyzer and cause the mass analyzer to mass analyze the second discrete batch of ions; and
   (5) cause an introduction of the third batch of ions into the mass filtering device, wherein said introduction of the third batch of ions is concurrent with at least a portion of the mass analyzing of the second discrete batch of ions.

3. A mass spectrometer system, comprising:
   (a) an ion source;
   (b) a mass filtering device configured to receive ions from the ion source;
   (c) an ion storage device configured to receive and accumulate mass-filtered ions received from the mass filtering device;
   (d) a fragmentation cell configured to receive accumulated mass-filtered ions from the ion storage device;
   (e) a mass analyzer configured to receive fragment ions from the fragmentation cell; and
   (f) a computer or electronic controller electrically coupled to the mass filtering device, the ion storage device, the fragmentation cell and the mass analyzer, the computer or electronic controller comprising computer-readable program instructions operable to:
      (1) prepare the mass filtering device to transmit therethrough ion species comprising a pre-determined range of mass-to-charge ratio (m/z) values;
      (2) cause the ion source to transmit a first batch of ion species to the mass filtering device, cause the mass filtering device to transmit a subset of the first batch of ion species to the ion storage device, and cause the ion storage device to accumulate the subset of the first hatch of ion species therein, whereby the transmitted subset of the first batch of ion species comprises m/z values within the predetermined range;
      (3) cause the ion storage device to transfer the accumulated subset of the first batch of ion species to the fragmentation cell, whereby the fragmentation cell generates a first set of fragment-ion species from the subset of the first batch of ion species;
      (4) cause the fragmentation cell to transfer the first set of fragment-ion species to the mass analyzer, whereby the first set of fragment-ion species are mass analyzed;
      (5) prepare the mass filtering device to transmit therethrough ion species comprising a second pre-determined range of m/z values, wherein said preparing is concurrent with at least a portion of either the accumulating of the subset of the first batch of ion species within the mass storage device, the generating of the first set of fragment-ion species or the mass analyzing of the first set of fragment-ion species;
      (6) cause the ion source to transmit a second batch of ion species to the mass filtering device, cause the mass filtering device to transmit, to the ion storage device, a subset of the second batch of ion species comprising m/z values within the second predetermined range and cause the ion storage device to accumulate the subset of the second batch of ion species therein, wherein said transmitting, transmitting and accumulating are concurrent with at least a portion of either the generating of the first set of fragment-ion species or the mass analyzing of the first set of fragment-ion species; and
      (7) prepare the mass filtering device to transmit therethrough ion species comprising a third pre-determined range of m/z values, wherein said preparing is concurrent with at least a portion of the mass analyzing of the first set of fragment-ion species.

* * * * *

UNITED STATES PATENT AND TRADEMARK OFFICE
CERTIFICATE OF CORRECTION

| | | |
|---|---|---|
| PATENT NO. | : 11,875,981 B2 | |
| APPLICATION NO. | : 17/810305 | |
| DATED | : January 16, 2024 | |
| INVENTOR(S) | : Michael W. Senko et al. | |

It is certified that error appears in the above-identified patent and that said Letters Patent is hereby corrected as shown below:

In the Claims

In Column 13, Claim 1, Line 16, delete "(f)" and insert -- (e) --, therefor.

In Column 13, Claim 1, Line 34, delete "clewing" and insert -- slewing --, therefor.

In Column 14, Claim 3, Line 18, delete "hatch" and insert -- batch --, therefor.

In Column 14, Claim 3, Line 47, delete "said transmitting," and insert -- said --, therefor.

Signed and Sealed this
Nineteenth Day of March, 2024

Katherine Kelly Vidal
*Director of the United States Patent and Trademark Office*